United States Patent

[11] 3,571,710

[72] Inventor Lynn P. West
Raleigh, N.C.
[21] Appl. No. 790,961
[22] Filed Jan. 14, 1969
[45] Patented Mar. 23, 1971
[73] Assignee International Business Machines Corporation
Armonk, N.Y.

[54] FSK COMMUNICATION SYSTEM UTILIZING CLAMPED DEMODULATOR OUTPUT
3 Claims, 4 Drawing Figs.

[52] U.S. Cl. .......... 325/30, 325/320, 178/66, 178/88, 179/15, 329/132
[51] Int. Cl. .......... H04l 27/10
[50] Field of Search .......... 325/(Inquired), 30, 320; 178/66, 88; 329/131, 133, 134; 179/15 (Cursory)

[56] References Cited
UNITED STATES PATENTS
3,233,181 2/1966 Calfee .......... 178/88
3,289,083 11/1966 Barr et al. .......... 325/30
3,501,704 3/1970 Webb .......... 325/320

*Primary Examiner*—Robert L. Griffin
*Assistant Examiner*—James A. Brodsky
*Attorneys*—Hanifin and Jancin and Vincent W. Cleary

ABSTRACT: A communication system which transmits binary data by a frequency shift keyer to a plurality of receiving stations while the receiving stations are on a common channel with the transmitter. Each receiving station utilizes an FM demodulator wherein normally the output voltage is directly proportional to the frequency received by the demodulator. In each receiving station, a maximum and a minumum output voltage for the demodulator is established. Between each of these voltage levels, information can be received; whereas, outside the voltage level, there are no transitions but a constant signal output. Thus, by adjusting different level ranges for each receiver, the transmitter can transmit to one desired station without effecting or passing information to the other stations.

INVENTOR.
LYNN P. WEST

BY Vincent N. Cleary
ATTORNEY

FSK COMMUNICATION SYSTEM UTILIZING CLAMPED DEMODULATOR OUTPUT

BACKGROUND OF THE INVENTION

1. Field of the Invention

Communication system.

2. Description of the Prior Art

In prior systems which utilize common channels, each receiving station is allocated a certain frequency range within which to receive information. In order to provide a maximum of utilization of the frequency spectrum, it is required that each channel have relatively sharp filters in order to receive its band and prevent interference with other terminals. These filters are expensive and also introduce distortion.

SUMMARY OF THE INVENTION

It is an object of the invention to provide a new and improved communication system.

A further object of the invention is the provision of a new and improved low cost communication system which can efficiently utilize the bandwidth for transmission from a transmitter to a plurality of receivers.

A still further object of the invention is to provide a new and improved receiver for a low cost communication system.

A still further object of the invention is the provision of a new and improved communication system and/or communication receiver which can efficiently utilize the frequency spectrum of a given communications channel.

In accordance with one form thereof, the above objects of the present invention are accomplished by a low cost communication system wherein each receiving station receives information in an allocated frequency band defined by two clamps at the output of a demodulator at the station. These clamps establish a minimum and a maximum output voltage for the demodulator. Since the amplitude of the output of the demodulator is a function of the frequency, these two clamps thereby establish the frequency band for the receiving station. If the signal being received is outside this range, the output of the demodulator will be a constant voltage level and this could be regarded as carrying no information. By utilizing these demodulators in this fashion, no filters are required to determine the receiving bandwidth and, furthermore, the channels can be moved closer together in frequency than systems utilizIng filters.

GENERAL DESCRIPTION

Figure 4:
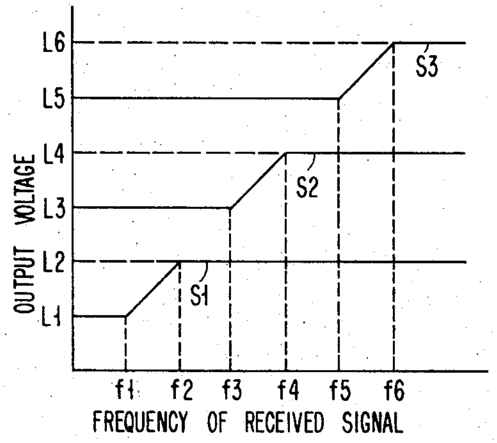
FIG. 4 is a graph illustrating the frequency of the signal received vs. output voltage of the three channels shown in FIG. 1.
Figure 3:
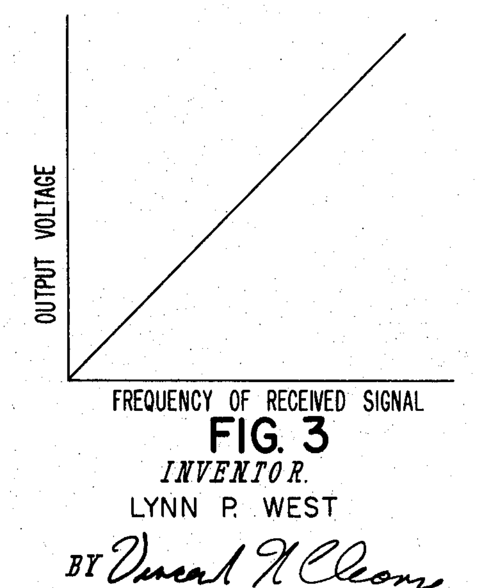
FIG. 3 is a graph useful in explaining the invention.

The binary information from the central processor 10 in the present system is converted into frequency information which is transmitted by the transmitter 20 selectively to one of the receivers S1, S2 or S3. Each one of the receivers has a demodulator that has an output voltage to frequency characteristic normally as shown in FIG. 3. This characteristic curve, however, is altered by having two clamps at the output of the demodulator. One clamp establishes a minimum output voltage and the other a maximum output voltage. As a result of this, unless the signal is between these two levels and consequently between two frequencies, the output of the demodulator will only be either the higher level or the lower level. This is illustrated, for example by station S1 and as shown in FIG. 4, has levels L1 and L2 formed by two clamps at the output of a demodulator at S1. Each station has its output thereby modified by two clamps. As a result, several schemes can be devised to transmit to one station without interfering with the other station. Such curves for stations S1, S2 and S3 are shown as S1, S2 and S3 in FIG. 4.

SPECIFIC DESCRIPTION

Figure 1:
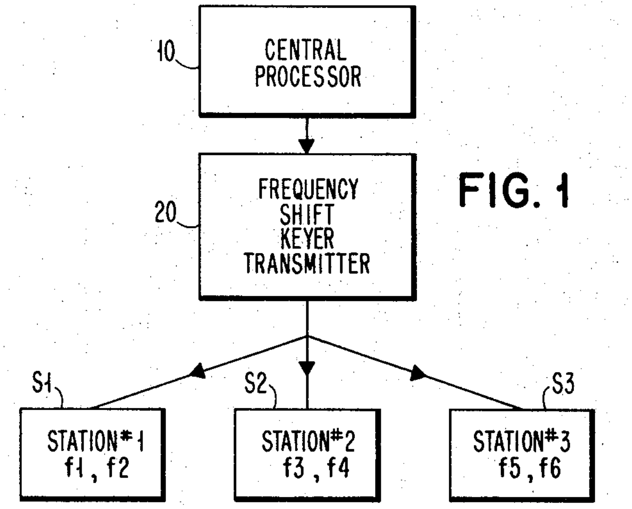
FIG. 1 is a schematic diagram in block form outlining the communication system embodying the invention.
Figure 2:
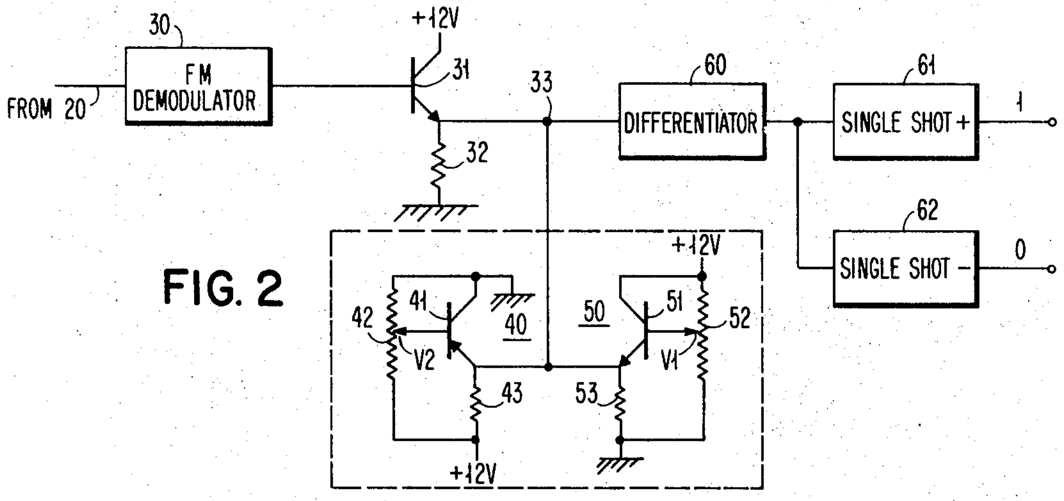
FIG. 2 is a schematic partially in block form of one of the receiving stations illustrated in FIG. 1.

The receivers S1, S2 and S3 are shown in more detail in FIG. 2. They each consist of an FM demodulator 30 which can be of many types but which has an output voltage which varies either as a direct function of (as shown in FIG. 3) or as an inverse function of, the frequency which is received by the demodulator. In the case described or illustrated, the output voltage varies directly as the frequency is received. A suitable demodulator is disclosed in my copending application Ser. No. 790,950, filed Jan. 14, 1969 and entitled "Demodulator."

The output of the demodulator 30, as shown in my copending application, is connected to an emitter follower stage such as 31, shown in FIG. 2, having an output terminal 33. This output terminal is connected to an upper frequency clamp 40 which determines the maximum output voltage and a lower frequency clamp 50 which determines the minimum output voltage to come from output terminal 33. The lower frequency clamp 50 has an NPN transistor 51 with an emitter resistor 53 connected between the emitter and ground. The output terminal 33 is connected to the emitter of transistor 51. The collector of transistor 51 is connected to a +12 volt collector supply and the variable resistor of potentiometer 52 is connected between the +12 volt supply and ground with the wiper being connected to the base of transistor 51. Varying the wiper position of the potentiometer 52 adjusts the minimum voltage level of the output signal. The transistor 51 will conduct unless the voltage at point 33 exceeds the voltage V1 applied to the base of transistor 51.

Clamp 40 establishes the maximum output voltage and, therefore, the upper frequency limit of the receiver. This clamp consists of a PNP transistor 41 having its collector grounded and its emitter connected through an emitter resistor 43 to a +12 volt supply. The resistor of a potentiometer 42 is connected between the 12 volt supply and ground with the wiper connected to the base of transistor 41. Terminal 33 is connected to the emitter of 41. When the output voltage at point 33 exceeds the voltage 'V2 applied to the base of transistor 41, transistor 41 conducts and maintains the output voltage at its upper level.

Thus, it is seen that potentiometer 52 is adjusted to determine the minimum output voltage of the demodulator and each channel (such as L1, L3 and L5 in FIG. 4). Potentiometer 42 is adjusted to determine maximum output voltage for the three channels such as L2, L4 and L6 shown in FIG. 4.

The output at point 33 could be utilized in various ways to obtain the information. One such example would be to have a zero indicated by the transmitter passing from the low frequency established by clamp 50 to the high frequency established by clamp 40 and a one indicated when transmitter 20 passes from the high frequency established by clamp 40 to the low frequency established by clamp 50. In such a case, these transitions would be put through a differentiator 60 to provide either a positive or a negative-going pulse at the output and then supplied to a single-shot 61 which can only be actuated by a positive-going pulse to indicate a one when so actuated. The differentiator 61 in such a case would also be connected to a single-shot 62, the type actuated only by a negative-going pulse to indicate a zero.

OPERATION OF THE INVENTION

As stated above, all of the demodulators in the receiver stations S1, S2 and S3 are the same and are shown in FIG. 2. The clamps 40 and 50 are adjusted (by adjusting potentiometers 42 and 52 at stations S1, S2 and S3) so as to produce the characteristic curves indicated as S1, S2 and S3 in FIG. 4 for the stations S1, S2 and S3, respectively. As such, in station S1, if the frequency of the signal received is below $f1$, the output voltage will be a constant L1 voltage regardless of the received frequency. Any signals that are received above frequency $f2$ result in the same higher output voltage L2 regardless of the frequency. The demodulators in stations S2 and S3 are similarly adjusted, so that adjusting the potentiometers 52 will effect the lower frequency limits $f3$ and $f5$, and adjusting the potentiometers 42 will effect the upper frequencies $f4$ and $f6$. Thus, when the transmitter is transmitting to station S1 in the frequency range between $f1$ and $f2$, stations S2 and S3 will have an output of L3 and L5, respectively. Since the variations occur in the $f1$ to $f2$ range, the outputs of L3 and L5 for stations S2 and S3 will remain constant and it will be recognized that no information is being passed to these stations.

When information is transmitted to station S2 and the frequency of transmitter 20 is varied between $f3$ and $f4$, the demodulator 30 of station S1 will have an output L2 that will not vary; whereas, demodulator 30 of station S3 will have an output L5 that will not vary. Since only S2 sees transitions of changes between L3 and L4 by transmission in the frequency range of $f3$ to $f4$, only station S2 will recognize that information is being transmitted thereto.

When information is transmitted to station S3 in the frequency range of $f5$ to $f6$, station S1 will have a constant output of level L2; whereas, station S2 will have a constant output of L4 thereby recognizing that information is not meant to be transmitted to this station. The transitions between L5 and L6 at station S3 will be recognized as information.

It will be understood that when the desired receiving station is receiving information, single-shots such as 61 and 62 will have outputs that vary or are turned on to thereby provide indications of ones and zeros being transmitted by transmitter 20. The corresponding single-shots in the other stations will not be turned on thereby indicating no information is meant to be received at these other stations.

It will be understood that in the graph of FIG. 4, the output voltages L1, L2 through L6 are of increasing value as are the frequencies of $f1$, $f2$ through $f6$. It will be understood however, that the information coulc be utilized in another fashion by recognizing the higher and lower frequencies of each channel as ones and zeros. Self-clocking would be used to recognize more than one zero or one in a row. In such a case, the system would not be sensitive just to transitions but merely to the two levels of the output which would be changing in only one station.

It will be noted that, in any case, one channel information is transmitted without interferring with the other channels and this is all done without the use of expensive filters. Furthermore, due to the sharp characteristics enabled by the two clamps 40 and 50, improved performance in filtering is achieved without filters.

While in accordance with the Patent Statutes, I have described what is at present considered to be the preferred embodiment of my invention, it will be understood by those skilled in the art that variations in form may be made therein without departing from the spirit and scope of the invention.

I claim:

1. A digital communication system comprising:
a source of binary information;
a frequency shift keying transmitter connected to said source for transmitting a signal representative of said binary information and shifting the frequency of said signal between a first and a second frequency;
a receiving station for receiving said signal, comprising a frequency modulation demodulator, the output voltage of which varies as a function of the frequency of said signal;
a first clamp at the output of the demodulator, adapted to establish a maximum output voltage level of the demodulator;
a second clamp at the output of the demodulator adapted to establlsh a minimum output voltage level of the demodulator; whereby the first and second clamps act upon the output of the frequency modulation demodulator to provide an output band therefor between the minimum and maximum voltage levels without requiring a band-pass filter; wherein said frequency shift keying transmitter is additioning capable of varying the frequency of said signal between a third and fourth frequency;
a second receiving station including a second frequency modulation demodulator, the output voltage of which varies as a function of the frequency of said signal;
a third clamp at the output of the second demodulator, adapted to establish a minimum output voltage level for said second demodulator which is above said maximum output level of said first demodulator; and
a fourth clamp connected to the output of said second demodulator, adapted to establish a maximum output voltage level for said second demodulator; whereby the third and fourth clamps act upon the output of the frequency modulation demodulator to provide an output band therefor between the minimum and maximum voltage levels for the second demodulator, without requiring a band-pass filter.

2. A communication system as set forth in claim 1 wherein said first receiving station includes first detector means connected to the output of said first demodulator and including means for detecting movement of the output thereof between the minimum and maximum output levels thereof; and said second receiving station includes second detector means connected to the output of said second demodulator including means detecting movement of the output thereof between the minimum and maximum output levels of said second demodulator.

3. The digital communication system of claim 1 wherein:
the first clamp includes a first transistor, a first emitter resistor, and a first potentiometer having a first wiper adjustably cooperable with a first potentiometer resistor;
the first transistor being of the PNP type and having a grounded collector,
the emitter of said first transistor connected through the first emitter resistor to a DC voltage source,
the first potentiometer resistor connected between the DC voltage source and ground, and
the first potentiometer wiper connected to the base of the first transistor;
the second clamp includes a second transistor, a second emitter resistor, and a second wiper adjustably cooperable with a second potentiometer resistor;
the second transistor being of the NPN type and having a grounded emitter,
the emitter of said second transistor connected through the second emitter resistor to ground,
the collector of said second transistor connected to the DC voltage source,
the second potentiometer resistor connected between the DC voltage source and ground, and
the second potentiometer wiper connected to the base of the second transistor; and
the emitters of the first and second transistors of the first and second clamps being connected jointly to an output of the frequency modulation demodulator.